(12) United States Patent
Seo et al.

(10) Patent No.: US 9,883,545 B2
(45) Date of Patent: Jan. 30, 2018

(54) APPARATUS AND METHOD FOR SELECTING CHANNEL IN WIRELESS COMMUNICATION SYSTEM

(71) Applicant: Samsung Electronics Co., Ltd., Gyeonggi-do (KR)

(72) Inventors: Eun-Young Seo, Gyeonggi-do (KR); Hee-Seung Kim, Gyeonggi-do (KR); Seok-Yong Lee, Seoul (KR); Ohyun Jo, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 71 days.

(21) Appl. No.: 14/796,889

(22) Filed: Jul. 10, 2015

(65) Prior Publication Data
US 2016/0014837 A1 Jan. 14, 2016

(30) Foreign Application Priority Data

Jul. 11, 2014 (KR) ........................ 10-2014-0087666

(51) Int. Cl.
*H04B 7/212* (2006.01)
*H04W 76/02* (2009.01)

(52) U.S. Cl.
CPC ........ *H04W 76/027* (2013.01); *H04W 76/023* (2013.01)

(58) Field of Classification Search
CPC .. H04M 3/561; H04Q 11/0428; H04L 5/1423; H04L 5/16; H04L 25/22; H04B 7/2125; H04B 7/2126

(Continued)

(56) References Cited

U.S. PATENT DOCUMENTS 8,509,105 B2 * 8/2013 Kneckt ............. H04W 74/0833
370/252
8,570,898 B1 * 10/2013 Kopikare .............. H04W 8/005
370/254

(Continued)

OTHER PUBLICATIONS

"Wi-Fi Peer-to-Peer (P2P) Technical Specification"; Wi-Fi Alliance Technical Committee P2P Task Group; Version 1.2; 2010; 159 pages.

*Primary Examiner* — Brenda H Pham

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). The present disclosure relates to a method and apparatus for selecting a channel in a wireless communication system. A method of operating a terminal in a wireless communication system is provided. The method includes transmitting information regarding a second channel and information regarding a third channel to a peer terminal in a first channel. The method also includes transmitting a first request signal for connection with the peer terminal in the second channel. The method further includes if a response signal for the first request signal is not received in the second channel, transmitting a second request signal for connection with the peer terminal in the third channel. The first channel belongs to a first band, and the second channel belongs to a second band. The present disclosure also includes other exemplary embodiments different from the aforementioned exemplary embodiment.

20 Claims, 13 Drawing Sheets

(58) Field of Classification Search
USPC .................................. 370/270, 282, 293, 324
See application file for complete search history.

(56) References Cited

U.S. PATENT DOCUMENTS

| | | | |
|---|---|---|---|
| 8,599,813 B2 | 12/2013 | Cordeiro et al. | |
| 8,818,278 B2* | 8/2014 | Levy ................. | H04W 52/0216 |
| | | | 455/41.2 |
| 8,838,031 B2* | 9/2014 | Wu .................... | H04W 76/023 |
| | | | 455/41.2 |
| 9,055,391 B2* | 6/2015 | Kim ..................... | H04W 4/005 |
| 9,173,161 B2* | 10/2015 | Tng ........................ | H04L 67/16 |
| 9,380,518 B2* | 6/2016 | Jung .................... | H04W 48/16 |
| 2012/0182954 A1 | 7/2012 | Cordeiro et al. | |
| 2013/0223280 A1* | 8/2013 | Choi .................... | H04L 67/104 |
| | | | 370/254 |
| 2016/0143072 A1* | 5/2016 | Kondabattini ...... | H04W 76/023 |
| | | | 455/39 |

\* cited by examiner

| OPERATING CHANNEL | | |
|---|---|---|
| BAND ID | CHANNEL NUMBER | TIMEOUT DURATION |

601

| SECONDARY CHANNEL | | |
|---|---|---|
| BAND ID | CHANNEL NUMBER | TIMEOUT DURATION |

603

| CHANNEL LIST | | |
|---|---|---|
| BAND ID | CHANNEL NUMBER | TIMEOUT DURATION |
| BAND ID | CHANNEL NUMBER | TIMEOUT DURATION |
| BAND ID | CHANNEL NUMBER | TIMEOUT DURATION |

APPARATUS AND METHOD FOR SELECTING CHANNEL IN WIRELESS COMMUNICATION SYSTEM

CROSS-REFERENCE TO RELATED APPLICATION AND CLAIM OF PRIORITY

The present application is related to and claims benefit under 35 U.S.C. § 119(a) of a Korean patent application filed in the Korean Intellectual Property Office on Jul. 11, 2014 and assigned Serial number 10-2014-0087666, the entire disclosure of which is hereby incorporated by reference.

TECHNICAL FIELD

The present invention relates to a method and apparatus for selecting a channel in a wireless communication system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In general, communication between devices is achieved via an Access Point (AP) in a wireless Local Area Network (LAN) system, Recently, however, devices for performing communication are diversified, and a method of performing direct communication between the devices without the aid of the AP has been developed to effectively use a radio resource. This is referred to as a peer to peer (P2P) mechanism, a device to device (D2D) mechanism, and the like.

If the devices directly communicate with each other, the communication may be achieved through a specific channel. Optionally, the communication may be maintained while changing the channel. In general, if the direct communication is achieved between two devices, a procedure of establishing an initial connection between the two devices includes a process of finding peer devices in the specific channel, a process of predetermining a channel through which data is exchanged, and a process of changing a channel to the channel pre-determined to exchange the data.

If a frequency characteristic is similar between a channel to which the two devices are connected before channel changing and a channel which is changed to exchange data in practice, a possibility that a connection between the two devices fails in the changed channel is very low. However, the frequency characteristic may be different between the channel to which the two devices are connected before channel changing and the channel which is changed to exchange data. In this case, even if the connection is completely achieved between the two devices before the channel changing, there is a high possibility that the connection in the changed channel fails since a channel characteristic after the changing is different from that of the existing channel.

SUMMARY

To address the above-discussed deficiencies, it is a primary object to provide a method and apparatus for communication between terminals in a wireless communication system.

Another exemplary embodiment of the present disclosure provides a method and apparatus for decreasing a connection delay for communication between terminals in a wireless communication system. Another exemplary embodiment of the present disclosure provides a method and apparatus for predetermining a channel for re-attempting a connection when communication is achieved between terminals in a wireless communication system. Another exemplary embodiment of the present disclosure provides a method and apparatus for sharing a channel for re-attempting a connection when communication is achieved between terminals in a wireless communication system.

Another exemplary embodiment of the present disclosure provides a method and apparatus for pre-indicating information regarding a frequency band at which communication is achieved between terminals in a wireless communication system. Another exemplary embodiment of the present disclosure provides a method and apparatus for determining a reference time for deciding whether a connection fails when communication is achieved between terminals in a wireless communication system. Another exemplary embodiment of the present disclosure provides a method and apparatus for sharing a reference time for deciding whether a connection fails when communication is achieved between terminals in a wireless communication system.

According to an exemplary embodiment of the present disclosure, a method of operating a terminal in a wireless communication system is provided. The method includes transmitting information regarding a second channel and information regarding a third channel to a peer terminal on a first channel. The method also includes transmitting a first request signal for connection with the peer terminal in the second channel. The method further includes if a response signal for the first request signal is not received, transmitting a second request signal for connection with the peer terminal on the third channel, wherein the first channel and the second channel belong to different frequency bands.

According to another exemplary embodiment of the present disclosure, a method of operating a terminal in a wireless communication system is provided. The method includes receiving information regarding a second channel and information regarding a third channel from a peer terminal on a first channel. The method also includes attempting to receive a first request signal from the peer terminal on the second channel. The method further includes if the first request signal is not received from the peer terminal attempting to receive a second request signal from the peer terminal on the third channel, wherein the first channel and the second channel belong to different frequency band.

According to another exemplary embodiment of the present disclosure, a terminal in a wireless communication system is provided. The terminal includes a transceiver. The terminal also includes a controller configured to transmit information regarding a second channel and information regarding a third channel to a peer terminal on a first channel via the transceiver, to transmit a first request signal for connection with the peer terminal on the second channel, and to transmit a second request signal for connection with the peer terminal on the third channel if a response signal for the first request signal is not received, wherein the first channel and the second channel belong to different frequency bands.

According to another exemplary embodiment of the present disclosure, a terminal in a wireless communication system is provided. The terminal includes a transceiver. The terminal also includes a controller configured to receive information regarding a second channel and information regarding a third channel from a peer terminal on a first channel via the transceiver, to attempt to receive a first request signal from the peer terminal on the second channel, and to attempt to receive a second request signal from the peer terminal on the third channel if the first request signal is not received, wherein the first channel and the second channel belong to different frequency bands.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates an example of a configuration of an operating channel, a secondary channel, and a channel list in a wireless communication channel according to this disclosure;

DETAILED DESCRIPTION

Figure 1:
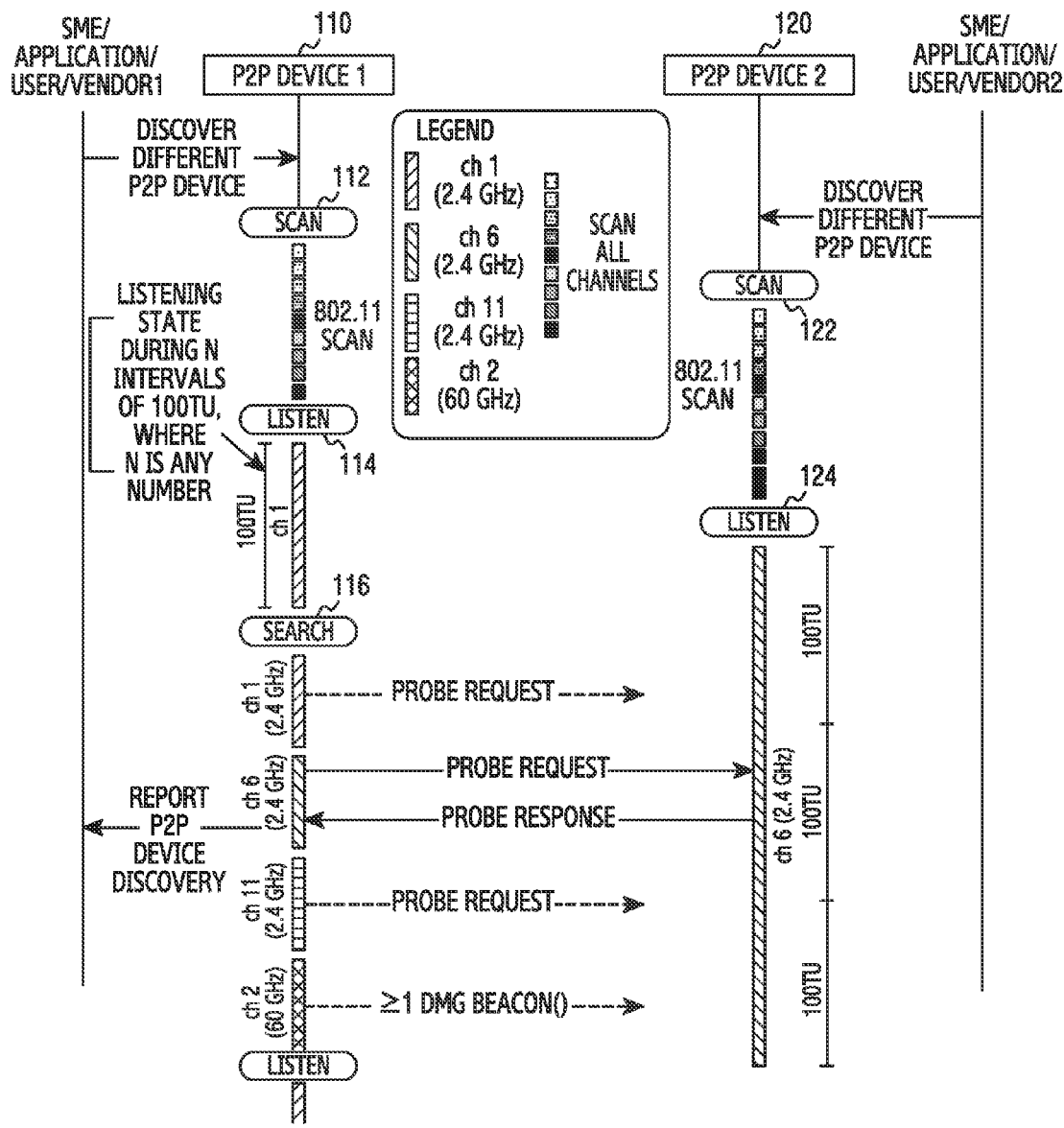
FIG. 1 illustrates an example connection procedure for Peer to Peer (P2P) communication in a wireless communication system according to this disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device and communication system.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

As used herein, the expressions "include" and "may include" refer to the existence of a corresponding function, operation, or element, and do not exclude one or more additional functions, operations, or elements. Also, as used herein, the terms "include" and/or "have" should be construed to denote a certain feature, number, step, operation, element, component or a combination thereof, and should not be construed to exclude the existence or possible addition of one or more other features, numbers, steps, operations, elements, components, or combinations thereof.

Also, as used herein, the expression "or" includes any or all combinations of words enumerated together. For example, the expression "A or B" may include A, B, or both A and B.

The present disclosure described hereinafter relates to a method and apparatus for selecting a channel in a wireless communication system.

In the present disclosure, the terms about a connection setting between devices, the terms indicating the channels to connect between the devices, the terms about information transmitted/received between the devices, and the like may modify various elements, but the corresponding elements are not limited by these expressions. For example, the above expressions do not limit the sequence and/or importance of the corresponding elements. The above expressions may be used merely for the purpose of distinguishing one element from another element.

FIG. 1 illustrates an example connection procedure for P2P communication in a wireless communication system according to this disclosure. Referring to FIG. 1, a P2P device #1 110 and a P2P device #2 120 are used for a P2P connection in the wireless communication system. The P2P device #1 110 performs a scan process 112, a listen process 114, and a search process 116 to connect with the P2P device #2 120. In addition, the P2P device #1 110 repetitively performs the listen process 114 and the search process 116 until the connection is complete. Further, the listen process 114 and the search process 116 are combined with each other and are called a finding process. The P2P device #2 120 also performs a scan process 122 and a listen process 124.

First, the scan process 112 refers to a process of examining which channels are currently present for a connection between P2P devices. That is, the P2P device #1 110 generally scans the channels which are currently present for a P2P connection. For example, the P2P device #1 110 scans all channels which are present at a 2.4 GHz band.

Next, the listen process 114 refers to a state in which a P2P device selects a specific channel for a connection between P2P devices and waits to listen for a probe request which is transmitted from a different P2P device. That is, the P2P device #1 110 waits to listen in a connection channel in order to listen for the probe request that is transmitted by the P2P device #2 120.

The connection channel refers to a predetermined channel for a smooth connection between P2P devices. In this case, the connection channel includes a social channel. For example, if a P2P connection is established between the P2P device #1 110 and the P2P device #2 120 at a 2.4 GHz band, the social channel is determined to a channel 1, a channel 6, and a channel 11. In this case, the P2P devices randomly select the social channel to find a peer P2P device to be connected. If there is no response of a peer user during a specific time period in a specific channel among the social channels, the P2P devices move to another channel among the social channels. The finding process is achieved in the social channel because, if searching and listening are achieved in all channels of a specific band, a probability that a P2P device finds a different P2P device is decreased and thus a connection delay occurs.

In an exemplary embodiment of the present disclosure, through the listen process 114, the P2P device #1 110 waits to listen for the probe request which is transmitted from the P2P device #2 120 in the channel 1 which is a predetermined social channel.

In addition, the search process 116 refers to a state in which a P2P device actively searches for another P2P device through the probe request signal for a connection between P2P devices. In other words, the P2P device #1 110 sends a probe request signal to the P2P device #2 120 through the search process, and in response thereto, the P2P device #2 120 sends a probe response signal, and thus a connection is successfully established between the P2P device #1 110 and the P2P device #2 120. In addition, the probe request signal or the probe response signal include a P2P Information Element (IE), a Wi-Fi Simple Config (WSC) IE, a Robust Secure Network (RSN) IE, a supported regulatory IE, and the like.

For example, as shown in FIG. 1, the P2P device #1 110 transmits the probe request signal in each social channel, i.e., the channel 1, the channel 6, and the channel 11, at the 2.4 GHz band. In this case, the P2P device #2 120 is in a listening state in the channel 6. As long as the P2P device #2 120 is in the listening state in the channel 6, the P2P device #2 120 cannot respond to the probe request signal sent by the P2P device #1 110 in the channel 1 and the channel 6. However, in the channel 6, the P2P device 1#2 120 listens the probe request signal sent by the P2P device #1 110, and sends the probe response signal in response to the probe request signal.

When communication is possible between two devices in a specific social channel through the aforementioned finding process, the P2P devices proceed to a controller negotiation step at a later time. The controller implies a device for controlling a communication process in the communication between the devices. The controller negotiation implies a process of determining the controller. For example, the controller negotiation is referred to as a Group Owner (GO) negotiation.

The aforementioned description is for exemplary purposes only, and in this case, the wireless communication system includes a wireless Local Area Network (LAN) system. In addition, the wireless LAN system includes a Wireless Fidelity (Wi-Fi) system. Likewise, the P2P connection includes a Wi-Fi P2P connection. In addition, the P2P communication is referred to as 'D2D communication', 'communication between devices', 'direct communication between device', 'direct communication', and the like.

Figure 2:
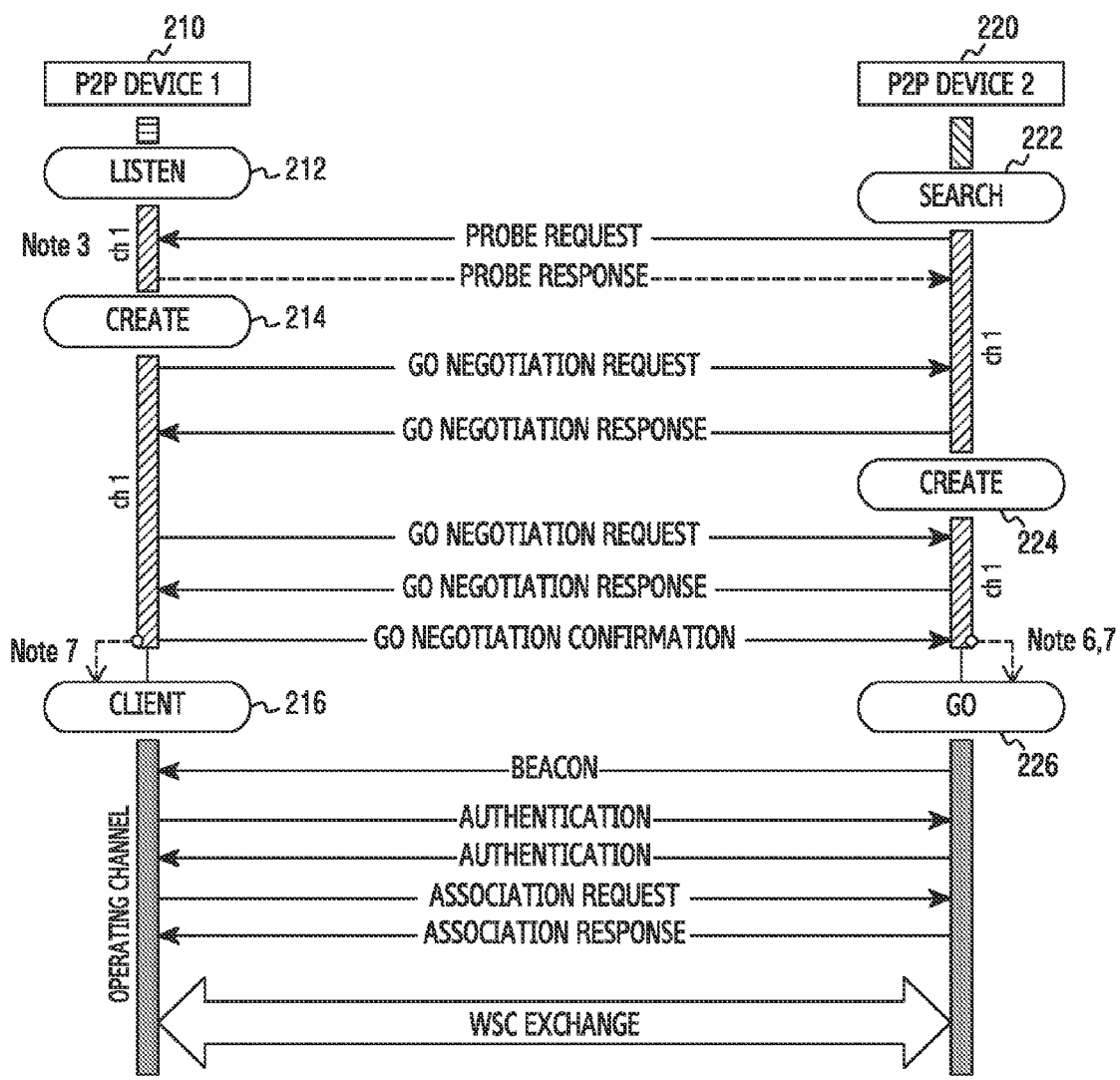
FIG. 2 illustrates an example connection procedure for P2P communication in a wireless communication system according to this disclosure.

FIG. 2 illustrates an example connection procedure for P2P communication in a wireless communication system according to this disclosure. Referring to FIG. 2, a P2P device #1 210 and a P2P device #2 220 perform a group creating process 214 and a right provisioning process to provide a P2P connection between the devices. The P2P device #1 210 performs a listen process 212. The P2P device #2 220 performs a search process 222 and a create process 224.

The group creating process 214 includes a controller negotiation process, in the controller negotiation process, which device will play a dominant role is determined among respective P2P devices for a P2P connection. In other words, the P2P device #1 210 and the P2P device #2 220 determine which device will have a dominant position for transmitting/receiving data between the two devices through the controller negotiation after the P2P connection is achieved. For example, through Group Owner (GO) negotiation, which device will be a GO and which device will be a client is negotiated.

More specifically, after the P2P device #1 210 and the P2P device #2 220 are connected in a social channel 1, the P2P device #1 210 transmits a GO negotiation request signal to the P2P device #2 220, and in response thereto, the P2P device #2 220 transmits a GO negotiation request signal to the P2P device #1 210. If the P2P device #2 220 transmits a response signal which indicates that information cannot be used because a specific parameter cannot be accepted, the P2P device #1 210 transmits a new GO negotiation request signal. In response thereto, if the P2P device #2 220 transmits a response signal which indicates that the request will be accepted, the P2P device #1 210 transmits a GO negotiation confirmation signal, and thus the GO negotiation is finished.

Thereafter, as shown in FIG. 2, if the P2P device #1 210 is determined as a client 216 and the P2P device #2 220 is determined as a GO 226, communication between the P2P device #1 210 and the P2P device #2 220 is achieved in an operating channel at a later time. The right provisioning process is first required to achieve the communication. In addition, the right provisioning process includes an authentication process and an association process.

Figure 3:
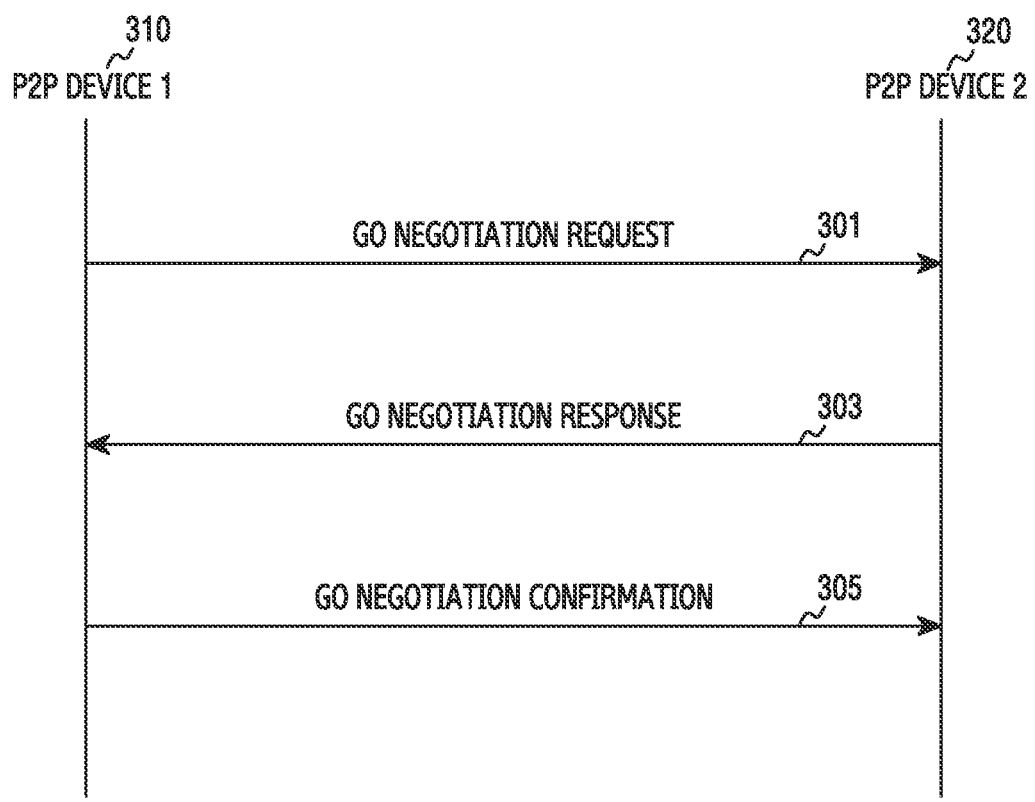
FIG. 3 illustrates an example connection procedure for P2P communication in a wireless communication system according to this disclosure.

FIG. 3 illustrates an example connection procedure for P2P communication in a wireless communication system according to this disclosure. Referring to FIG. 3, in step 301, a P2P device #1 310 and a P2P device #2 320 transmit a GO negotiation request signal. The GO negotiation request signal reports to the P2P device #2 320 that the P2P device #1 310 will be used as a controller. The GO negotiation request signal includes a P2P IE and a WSC IE. The P2P IE includes P2P capability, P2P device information, a GO intent, a timeout configuration, an intended P2P interface address, a channel list, and an operating channel attribute. In addition, a device password ID is included in the WSC IE.

Thereafter, in step 303, upon receiving the GO negotiation request signal, the P2P device #2 320 transmits a response signal to the P2P device #1 310. The GO negotiation response signal includes a P2P IE and a WSC IE. The P2P IE includes P2P capability, P2P device information, a GO intent, a timeout configuration, a listening channel, an extended listening time, an intended P2P interface address, a channel list, and an operating channel attribute, in addition, a device password ID is included in the WSC IE.

In step 305, upon receiving the GO negotiation response signal, the P2P device #1 310 transmits a GO negotiation confirmation signal to the P2P device #2 320. The GO negotiation confirmation signal includes a P2P IE. The P2P IE includes P2P capability, a state, a channel list, and an operating channel attribute.

If a 2.4 GHz band and a 5 GHz band are used for a P2P connection, a frequency characteristic of a social channel is similar to that of an operating channel used for communication after GO negotiation. Therefore, if a connection is successful in the social channel, a probability that a P2P connection is delayed due to a connection failure in the operating channel is not high. Therefore, devices share only an available channel list commonly agreed most basically in addition to the operating channel. In other words, a priority of other channels to be used in a connection failure situation is not predetermined. As a result, a situation of FIG. 4 described below occurs.

Figure 4:
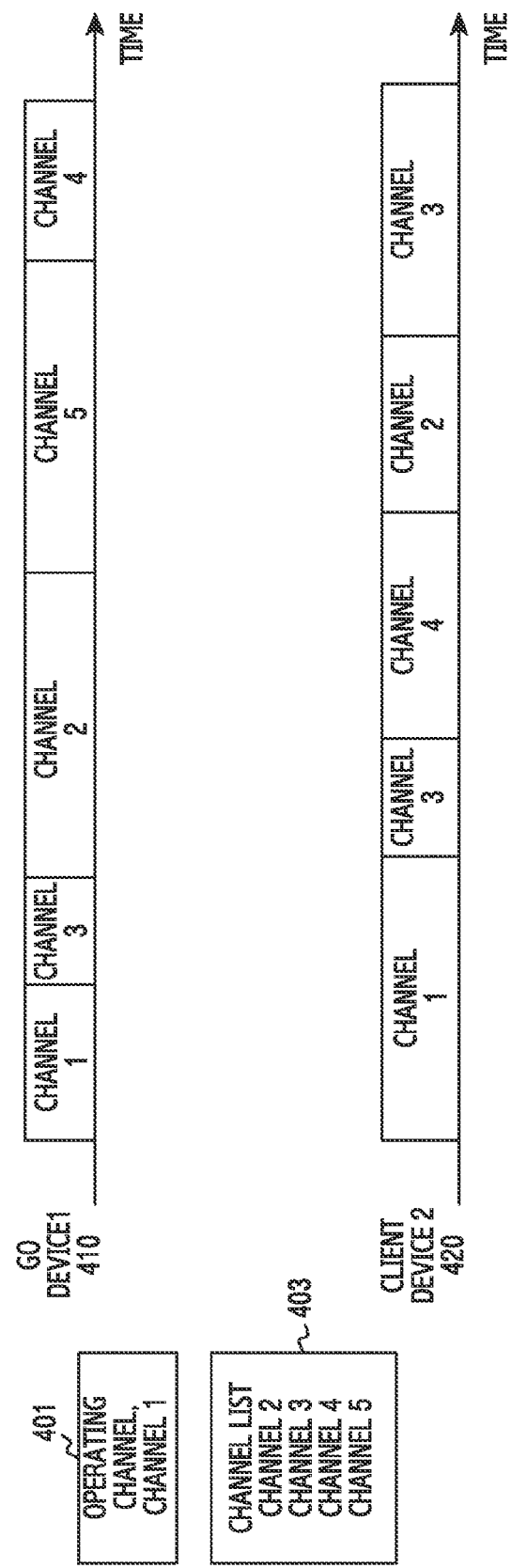
FIG. 4 illustrates an example of channels used to attempt a connection in a wireless communication system according to this disclosure.

FIG. 4 illustrates an example of channels used to attempt a connection in a wireless communication system according to this disclosure. Referring to FIG. 4, as described above with reference to FIG. 2 and FIG. 3, a device #1 410 and a device #2 420 exchange information regarding an operating channel 401 and a channel list 403 in a controller negotiation process, and share the channel list 403 with the operating channel 401. In this case, if a connection between the device #1 410 and the device #2 420 fails due to a deterioration of a frequency characteristic when an agreed operating channel, for example, a band of the operating channel is changed from a low frequency band to a higher frequency band, a P2P initial connection must be re-established. In this case, an additional delay time occurs. In addition, even if a peer terminal is discovered again through random channel selection as shown in the example of FIG. 4, the same problem is repeated due to a difference of the frequency characteristic caused by a band change. That is, if a band is changed, there is a case where a connection fails persistently in addition to a connection delay. This is the greatest cause of deterioration in user's service quality.

In particular, if there is a great difference between a frequency band of a channel in which the controller negotiation process is performed and a frequency band of the operating channel, a signal characteristic is significantly different. For example, if the controller negotiation process is performed at a 2.4 GHz band or a 5 GHz band and the operating channel belongs to a 60 GHz band, a linearity or arrival distance characteristic of the 60 GHz band is significantly different from that of the 2.4 GHz or 5 GHz frequency band. In this case, when it is intended to establish a connection in the operating channel of 60 GHz after performing signaling in a social channel of 2.4 GHz, a probability that a band or channel change fails is very high. Accordingly, a P2P connection is delayed. Therefore, there is a need to distinguish bands having different characteristics. Accordingly, operating channel information and channel list information is configured as shown in FIG. 5 described below.

Figure 5:
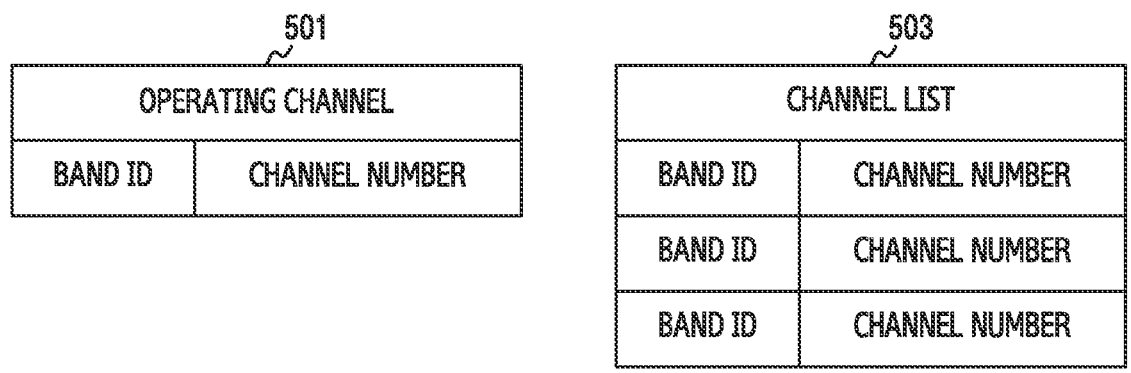
FIG. 5 illustrates an example of configuring an operating channel and a channel list in a wireless communication system according to this disclosure.

FIG. 5 illustrates an example of configuring an operating channel and a channel list in a wireless communication system according to this disclosure. As shown in FIG. 5, operating channel information 501 includes a band IDentification (ID) and a channel number of the operating channel. Herein, the band ID indicates a frequency band to which the operating channel belongs. That is, the band ID and the channel number are displayed together in information regarding the operating channel and exchanged by respective P2P devices in the controller negotiation process. In this case, the band ID includes information regarding to which frequency band the operating channel belongs. In addition, the channel list information 503 includes the band ID and channel numbers for a plurality of channels. That is, the band ID and the band number are displayed together in a channel list exchanged by the respective P2P devices in the controller negotiation process.

If the frequency characteristics are different from each other, a means of processing signals of respective frequencies is also different. In this case, each P2P device uses a band ID as shown in FIG. 5 to prepare for signal processing of a frequency corresponding to the band ID. More specifically, for example, if a MOdulation DEModulation (MODEM) for transmitting/receiving a signal at a 2.4 GHz band and a. MODEM for transmitting/receiving a signal at a 60 GHz band are implemented as different modules, the P2P device confirms in advance a band of a channel to be connected at a later time through the band ID and thus activates a module associated with a corresponding frequency band before a channel connection request. That is, when the band ID is included in information regarding the operating channel and the channel list, fast channel changing is achieved.

FIG. 6 illustrates another example of a configuration of an operating channel, a secondary channel, and a channel list in a wireless communication channel according to this disclosure. Referring to FIG. 6, operating channel information 601 includes a band ID and a channel number. In addition, channel list information 605 includes band IDs and channel numbers for a plurality of channels. In addition, in preparation for a case where a connection between P2P devices fails in the operating channel, secondary channel information 603 is added.

According to an exemplary embodiment of the present disclosure, in a control negotiation step, the P2P devices transmits or receives the secondary channel information 603 through a controller negotiation request signal, a controller negotiation response signal, and a controller negotiation confirmation signal. Even though the connection fails in the operating channel, the P2P devices confirm a secondary channel by using the secondary channel information 603, and re-perform rapidly a right provisioning process through the confirmed secondary channel.

According to another exemplary embodiment of the present disclosure, the existing channel list information 605 is utilized instead of the secondary channel information 603. For example, the secondary channel is identified on the basis of an order according to which each channel is listed in the channel list information 605. In this case, it is defined that, when a connection fails, the P2P devices re-attempt the connection according to a pre-defined order among channels in the channel list information 603. For example, the higher the location, the higher the priority. In this case, the secondary channel is a first channel on the channel list information 605. Herein, according to an exemplary embodiment of the present disclosure, an indicator is further included to agree to use the channel list information 605 according to a currently sorted order. The indicator is shared between the P2P devices in the negotiation step.

In addition, in the connection between the P2P devices, conventionally, if the connection fills in the operating channel, there is no information regarding a time duration after which the operating channel is changed to a different band or channel when changed to the different band or channel. Accordingly, since there is no method of effectively re-connecting in a channel to which a controller and a client move, a great delay occurs when the channel is changed.

In order to solve the problems, each P2P device which intends to establish a P2P connection needs to predetermine time information related to a connection termination. In other words, each P2P device avoids a delay which occurs when a channel is changed by allowing a signal exchanged in a controller negotiation process to include time information related to a mutual connection termination.

For example, as shown in FIG. 6, if a link connection is not established during a specific time duration in the operating channel, time information related to the connection termination is included to indicate that the channel will be changed to the secondary channel. In other words, the time information related to the connection termination, that is, a time duration, includes a timeout duration. That is, by adding a field regarding the timeout duration into information regarding the operating channel determined in the controller negotiation step, two devices are simultaneously changed to the secondary channel when the two devices are not connected even though an agreed specific time elapses. In addition, the timeout information is configured dynamically according to an interference situation of each channel and a user service requirement in addition, the timeout duration is added not only to information regarding the operating channel but also to information regarding the secondary channel and channel list. Likewise, the timeout duration is also applied to a case where each P2P device agrees in advance to attempt a connection on channels included in the existing channel list in order from top to bottom.

Figure 7:
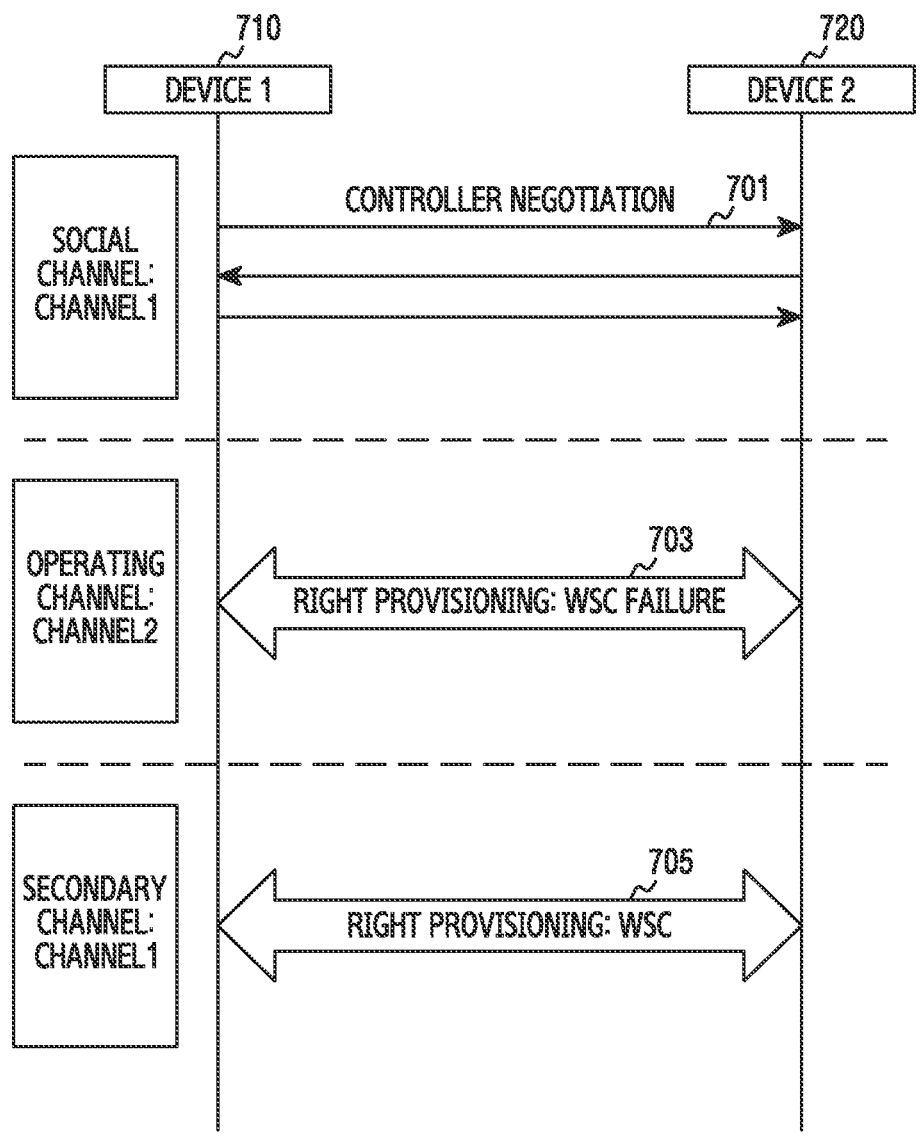
FIG. 7 illustrates an example connection procedure for P2P communication in a wireless communication system according to this disclosure.

FIG. 7 illustrates an example connection procedure for P2P communication in a wireless communication system according to this disclosure. Referring to FIG. 7, in step 701 of FIG. 7, a device #1 710 and a device #2 720 perform a controller negotiation process for communication with a peer terminal. In this case, the device #1 710 and the device #2 720 transmit or receive a signal for the control negotiation process through a first channel belonging to first band, that is, through a connection channel. In addition, through the controller negotiation process, the device #1 710 and the device #2 720 determine a second channel belonging to a second band, a third channel which is not limited to a specific band, and time information related to a connection termination, i.e., a time duration. The third channel can belong to the first band.

In the wireless communication system according to an exemplary embodiment of the present disclosure, channels that are used in P2P communication belong to the first band and the second band, and the first band and the second band have different frequency characteristics. As a result, the third channel belonging to the first band and the second channel belonging to the second band also have different frequency characteristics. For example, the first band includes a 2 GHz band, and the second band includes a 60 GHz band. Further, the third channel belonging to the first band, i.e., a secondary channel, is a 2.4 GHz band channel 5, and the second channel belonging to the second band, i.e., an operating channel, is a 60 GHz band channel 2.

Further, in the exemplary embodiment of the present disclosure, the time information implies a timeout duration. More specifically, a connection must be terminated if the device #1 710 and the device #2 720 fail in the connection even though a specific time elapses after each device attempts a connection in the second channel belonging to the second band. In this case, the device #1 710 and the device #2 720 need to agree with a time duration corresponding to the specific time. In other words, the device #1 710 and the device #2 720 predetermine the timeout duration, and thus terminate the connection if the connection between the device #1 710 and the device #2 720 becomes impossible even though a time elapses by the timeout duration from a time at which a connection is attempted in the second channel.

In the exemplary embodiment of the present disclosure, more specifically, the device #1 710 and the device #2 720 determine a 2.4 GHz band channel 1 as a social channel and thereafter perform controller negotiation in the social channel. In addition, through the controller negotiation, a 60 GHz band channel 2 is determined as an operating channel, a 2 GHz band channel 5 is determined as a secondary channel, and a timeout duration is determined as 100 ms.

Thereafter, in step 703, the device #1 710 and the device #2 720 attempt a connection in the second channel belonging to the second band according to a result determined through the controller negotiation process. In other words, the device #1 710 and the device #2 720 complete the controller negotiation process through the first channel belonging to the first band, that is, through a connection channel, and thereafter terminate a connection in the connection channel. Further, the device #1 710 and the device #2 720 attempt a connection in a new second channel belonging to the second band. In this case, if the connection is not complete even though a delay occurs by a time related to the connection termination from a time of attempting the connection, the device #1 710 and the device #2 720 terminate the connection in the new second channel belonging to the second band.

More specifically, the process in which the device #1 710 attempts the connection with the device #2 720 is achieved when the device #1 710 transmits a signal to the device #2 720. That is, for the connection with the device #2 720, the device #1 710 transmits a request signal to the device #2 720. The request signal includes a first request signal transmitted in the second channel and a second request signal transmitted in the third channel. In addition, the request signal includes a beacon. In particular, how near a target is or where the target passes is recognized by using a wireless communication technique such as infrared or Radio Frequency (RF). Accordingly, if the device #2 720 normally receives the request signal transmitted by the device #1 710, it is regarded that the connection between the device #1 710 and the device #2 720 is successfully established, and if the device #2 720 fails to normally receive the request signal transmitted from the device #1 710, it is regarded that the connection between the device #1 710 and the device #2 720 fails.

In the wireless communication system according to the exemplary embodiment of the present disclosure, the device #1 710 and the device #2 720 attempt a connection in the second channel belonging to the second channel, i.e., in an operating channel, when P2P communication is performed. More specifically, the device #1 710 and the device #2 720 attempt a connection in a 60 GHz band channel 2. In other words, the device #1 710 and the device #2 720 attempt the connection in the operating channel determined in the controller negotiation process, for example, in the 60 GHz band channel 2.

In addition, if the connection between the device #1 710 and the device #2 720 cannot be complete at a time at which a delay occurs by a timeout duration, e.g., 100 ms, from a time at which the device #1 710 and the device #2 720 attempt the connection in the operating channel, for example, the 60 GHz band channel 2, the device #1 710 and the device #2 720 terminate the connection in the operating channel, i.e., the 60 GHz band channel 2.

Next, in step 705, the device #1 710 and the device #2 720 re-attempt a connection in the third channel belonging to the first band. In other words, if the connection between the device #1 710 and the device #2 720 fails in the second channel belonging to the second band as shown in the previous step 703, the device #1 710 and the device #2 720 terminate the connection with the second channel belonging to the second hand, and re-attempt the connection in the third channel belonging to the first band.

According to an exemplary embodiment of the present disclosure, the third channel includes a secondary channel. Therefore, through the pre-determined secondary channel information, even if a connection fails in the operating channel, the device #1 710 and the device #2 720 rapidly re-perform a right provisioning process through the secondary channel.

According to another exemplary embodiment of the present disclosure, the existing channel list information is utilized instead of the secondary channel information. For example, the secondary channel is identified on the basis of an order according to which each channel is listed in the channel list information. In this case, it is defined that, when a connection fails, the device #1 710 and the device #2 720 re-attempt the connection according to a pre-defined order among channels in the channel list information. For example, the higher the location, the higher the priority, in this case, the secondary channel is a first channel on the channel list information. Herein, according to an exemplary embodiment of the present disclosure, an indicator is further included to agree to use the channel list information according to a currently sorted order. According to an exemplary embodiment of the present disclosure, the secondary channel is a 2.4 GHz band channel 5. More specifically, the device #1 710 and the device #2 72.0 re-attempt a connection at the secondary channel, i.e., the 2.4 GHz band channel 5, determined in the controller negotiation process.

Figure 8:
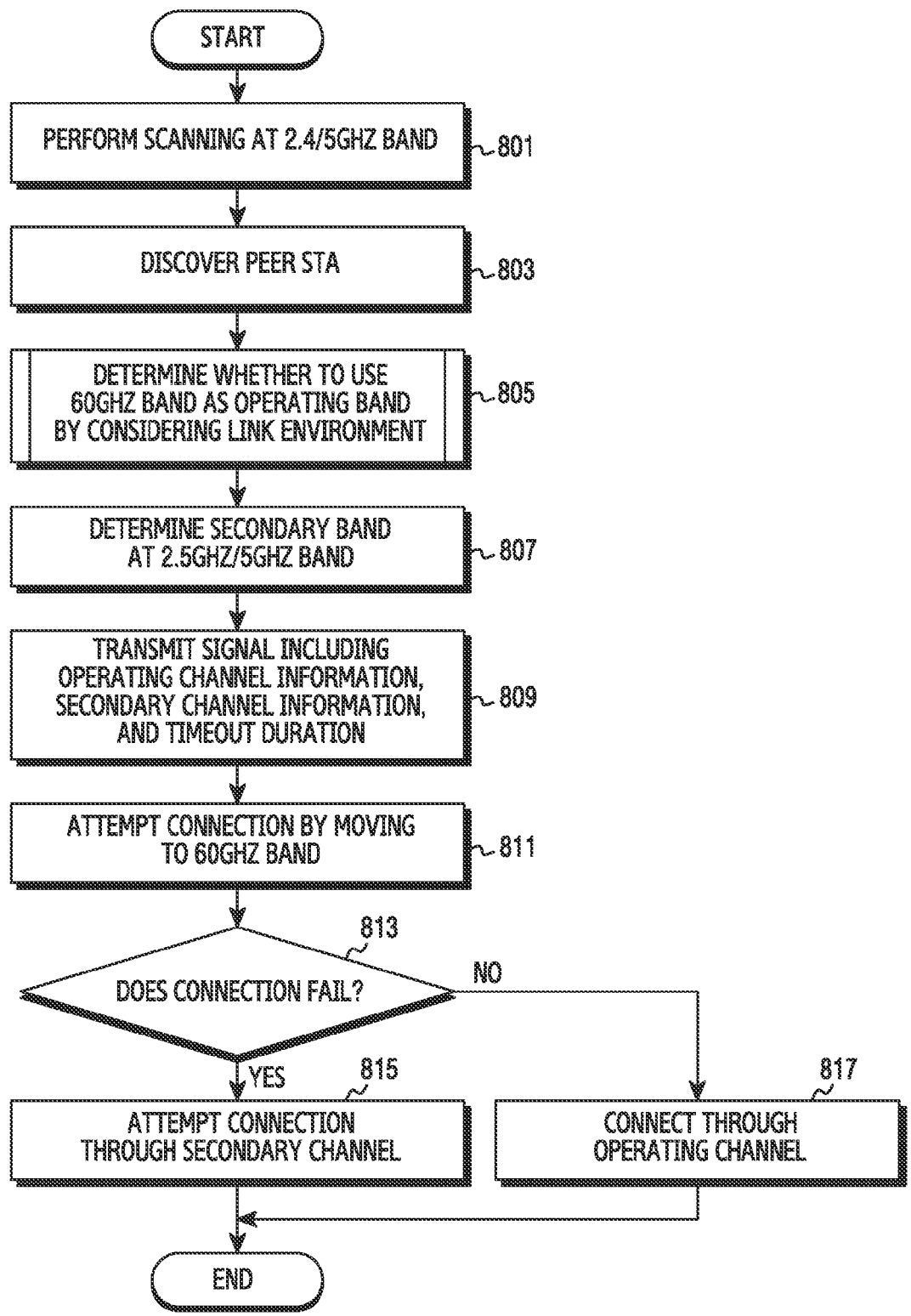
FIG. 8 is a flowchart of an example connection procedure for P2P connection in a wireless communication system according to this disclosure.

FIG. 8 is a flowchart of an example connection procedure for P2P connection in a wireless communication system according to this disclosure, First, in step 801, a scanning process is performed in which a specific P2P device confirms a channel to be used in a further connection to discovery a different P2P device. In step 803, the specific P2P device discovers a different peer STAtion (STA), for example, a different P2P device, as a result of the scanning.

Thereafter, in step 805, the specific P2P device determines whether some of channels in a 60 GHz band will be used as an operating channel by considering a link environment. Such an operation will be described below in greater detail with reference to FIG. 9. If it is determined in step 805 that the channel in the 60 GHz band is used as the operating channel, in step 807, in preparation for a case where a connection with a different P2P device fails in the channel of the aforementioned hand, the specific P2P device predetermines a secondary channel in the 2.5 GHz or 5 GHz hand, i.e., a secondary band.

Thereafter, in step 809, the specific P2P device transmits to the different P2P device a signal including operating channel information, secondary channel information, and timeout duration determined in a previous process. Thereafter, in step 811, the specific P2P device attempts a connection with the different P2P device by moving to the 60 GHz hand, i.e., the operating channel. If at step 813, the connection fails as a result of the connection attempt, the procedure proceeds to step 815, and otherwise proceeds to step 817.

If the procedure proceeds to step 815, the specific P2P device confirms the secondary channel from the secondary channel information, changes to the confirmed secondary channel from the operating channel, and thereafter attempts a connection with the different P2P device through the secondary channel. Otherwise, if the procedure proceeds to step 817, the specific P2P device is connected with the different P2P device through the operating channel.

Figure 9:
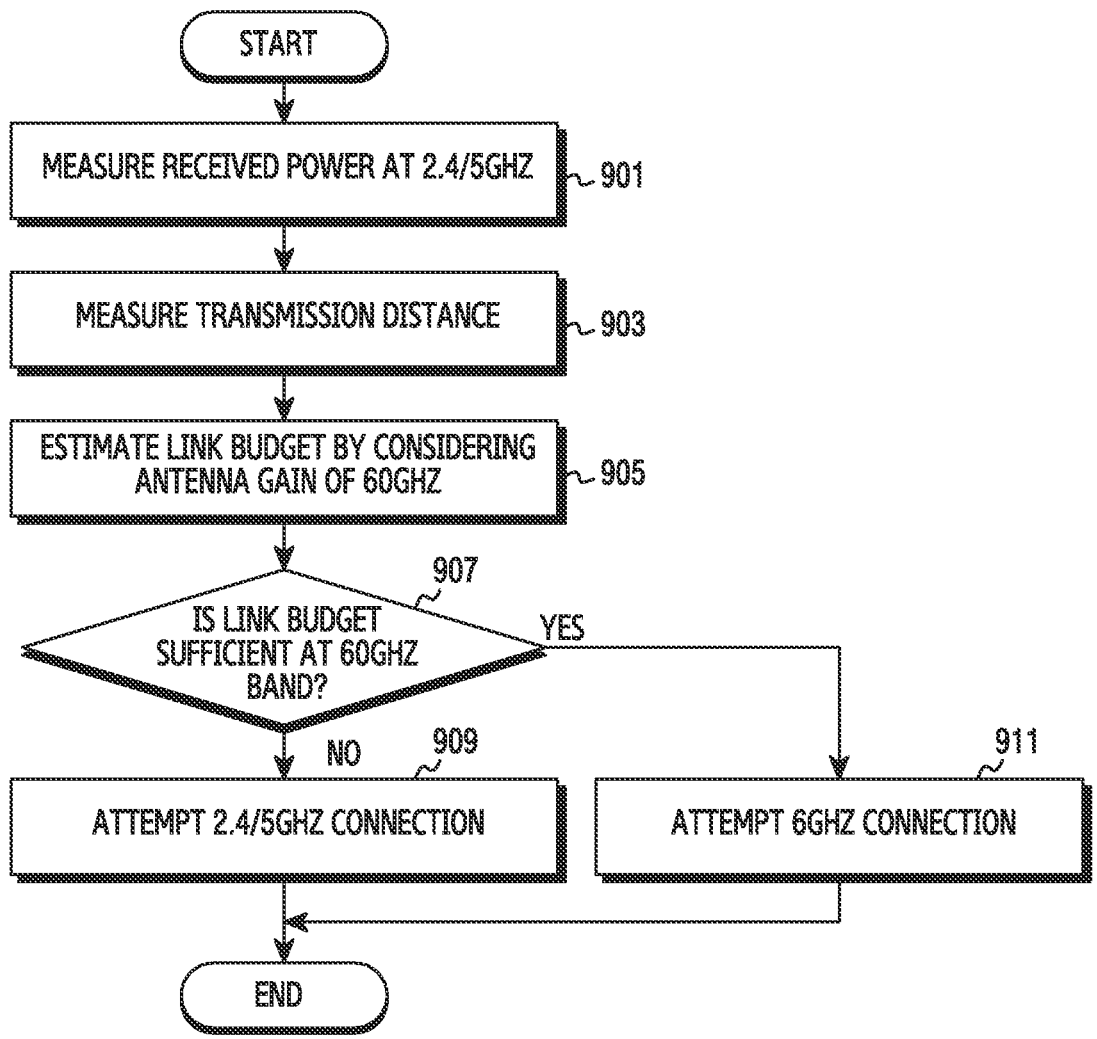
FIG. 9 is a flowchart regarding an example method for selecting an operating channel for P2P communication in a wireless communication system according to this disclosure.

FIG. 9 is a flowchart regarding a method for selecting an operating channel for P2P communication in a wireless communication system according to an exemplary embodiment of the present disclosure. First, in step 901, a specific P2P device measures received power regarding a signal received from a different P2P device at a 2.4 GHz or a 5 GHz band. In step 903, the specific P2P device measures a transmission distance between P2P devices on the basis of received power measured in step 901. In step 905, the specific P2P device estimates a link budget by considering an antenna gain of a 60 GHz band. In step 907, if it is determined that the estimated link budget is sufficient, the procedure proceeds to step 911, and otherwise proceeds to step 909.

If the procedure proceeds to step 911, the specific P2P device attempts a connection with a different P2P device at the 60 GHz band. Otherwise, if the procedure proceeds to step 909, the specific P2P device attempts a connection with the different P2P device at the 2.5 GHz band or the 5 GHz band.

Through the aforementioned procedure, the P2P device estimates the link budget of the 60 GHz band to distinguish in advance a case where the connection is impossible at the 60 GHz band. In this case, the P2P device excludes the connection at the 60 GHz band, and thus prevents an increase in a connection delay time if the connection fails at the 60 GHz band.

Figure 10:
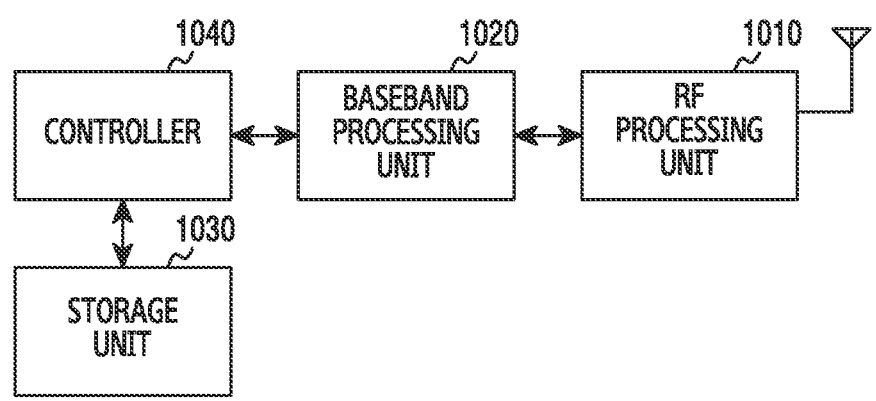
FIG. 10 is a block diagram of an example terminal in a wireless communication system according to this disclosure.

FIG. 10 is a block diagram of an example terminal a wireless communication system according to an exemplary embodiment of the present disclosure. Referring to FIG. 10, the terminal includes a Radio Frequency (RF) processing unit 1010, a baseband processing unit 1020, a storage unit 1030, and a controller 1040. The RF processing unit 1010 performs a function for transmitting and receiving a signal through a wireless channel by performing signal band conversion, amplification, etc. That is, the RF processing unit 1010 up-converts a baseband signal provided from the baseband processing unit 1020 into an RF signal, and then transmits the RF signal through an antenna, and also down-converts an RF signal received through the antenna into a baseband signal. For example, the RF processing unit 1010 include a transmission filter, a reception filter, an amplifier, a mixer, an oscillator, a Digital to Analog Converter (DAC), an Analog to Digital Converter (ADC), and the like. Although only one antenna is illustrated in FIG. 10, the terminal has multiple antennas. In addition, the RF processing unit 1010 includes a plurality of RF chains. Further, the RF processing unit 1010 performs beamforming. For the beamforming, the RF processing unit 1010 adjusts a phase and size of each of signals transmitted/received through a plurality of antennas or antenna elements.

The baseband processing unit 1020 performs a conversion function between a baseband signal and a bit-stream according to a physical layer protocol of the system. For example, in a data transmission process, the baseband processing unit 1020 generates complex symbols by performing coding and modulation on a transmitted bit-stream. In addition, in a data reception process, the baseband processing unit 1020 restores a received bit-stream by performing demodulation and decoding on a baseband signal provided from the RF processing unit 1010. The baseband processing unit 1020 and the RF processing unit 1010 transmit and receive a signal as described above. Accordingly, the baseband processing unit 1020 and the RF processing unit 1010 are referred to as a transmission unit, a reception unit, or a communication unit.

The storage unit 1030 stores data such as a basic program for an operation of the terminal, an application program, setup information, and the like. In particular, information regarding an operating channel, a secondary channel, and a channel list determined in a controller negotiation process between respective devices for P2P communication described above with reference to FIG. 4 is stored in the storage unit 1030. Further, since the information regarding the operating channel, the secondary channel, and the channel list includes a band ID and a timeout duration as described above, the band ID and the timeout duration are also included in the storage unit 1030, in addition, the storage unit 1030 provides the stored data at the request of the controller 1040.

The controller 1040 controls overall operations of the terminal. For example, the controller 1040 transmits/receives a signal via the baseband processing unit 1020 and the RF processing unit 1010. Further, the controller 1040 writes and reads data in the storage unit 1040. For this, the controller 1040 includes at least one processor. According to the exemplary embodiment of the present disclosure, the controller 1040 controls the terminal to perform the procedure illustrated in FIG. 2, FIG. 3, FIG. 7, FIG. 8, FIG. 9, and FIG. 13. The controller 1040 according to an exemplary embodiment of the present disclosure operates as follows.

According to an exemplary embodiment of the present disclosure, the controller 1040 transmits a controller negotiation request signal via the baseband processing unit 1020 and the RF processing unit 1010. The controller negotiation request signal includes at least one of the operating channel information, the secondary channel information, and the channel list information. Further, the controller 1040 receives a controller negotiation response signal via the baseband processing unit 1020 and the RF processing unit 1010. The controller negotiation response signal reports that a peer terminal confirms information included in the controller negotiation request signal and accepts it. The controller 1040 transmits a request signal for a connection with the peer terminal in the operating channel via the baseband processing unit 1020 and the RF processing unit 1010. For example, the request signal includes a beacon. If a signal corresponding to the request signal cannot be received from the peer terminal, the controller 1040 determines a connection failure, and transmits a request signal for a connection with the peer terminal in a secondary channel via the baseband processing unit 1020 and the RF processing unit 1010.

According to an exemplary embodiment of the present disclosure, the secondary channel is indicated as a specific channel in the control negotiation process. However, according to another exemplary embodiment of the present disclosure, the secondary channel utilizes the existing channel list information. For example, the secondary channel is identified on the basis of an order according to which each channel is listed in the channel list information. In other words, the controller 1040 determines the connection failure, and thereafter specifies a secondary channel according to a predefined order among channels included in the channel list and transmits a request signal for the connection with the peer terminal via the baseband processing unit 1020 and the RF processing unit 1010 in the secondary channel.

According to another exemplary embodiment of the present disclosure, the controller 1040 receives a controller negotiation request signal via the baseband processing unit 1020 and the RF processing unit 1010. Further, the controller 1040 transmits a controller negotiation response signal via the baseband processing unit 1020 and the RF processing unit 1010. The controller 1040 receives a request signal for a connection with the peer terminal in an operating channel via the baseband processing unit 1020 and the RF processing unit 1010. If a signal corresponding to the request signal cannot be received from the peer terminal, the controller 1040 determines a connection failure, and receives a request signal for a connection with the peer terminal in a secondary channel via the baseband processing unit 1020 and the RF processing unit 1010.

According to another exemplary embodiment of the present disclosure, the controller 1040 confirms information indicating a frequency band included in information regarding the operating channel, secondary channel, and channel list determined through the controller negotiation process between respective devices. Further, the RF processing unit 1010 or the baseband processing unit 1020 can respectively operate a module for transmitting and receiving a signal of a specific band, such as 2.4 GHz band, and a module for transmitting and receiving a signal of a different band, e.g., 60 GHz band, through the information confirmed by the controller 1040.

Figure 11:
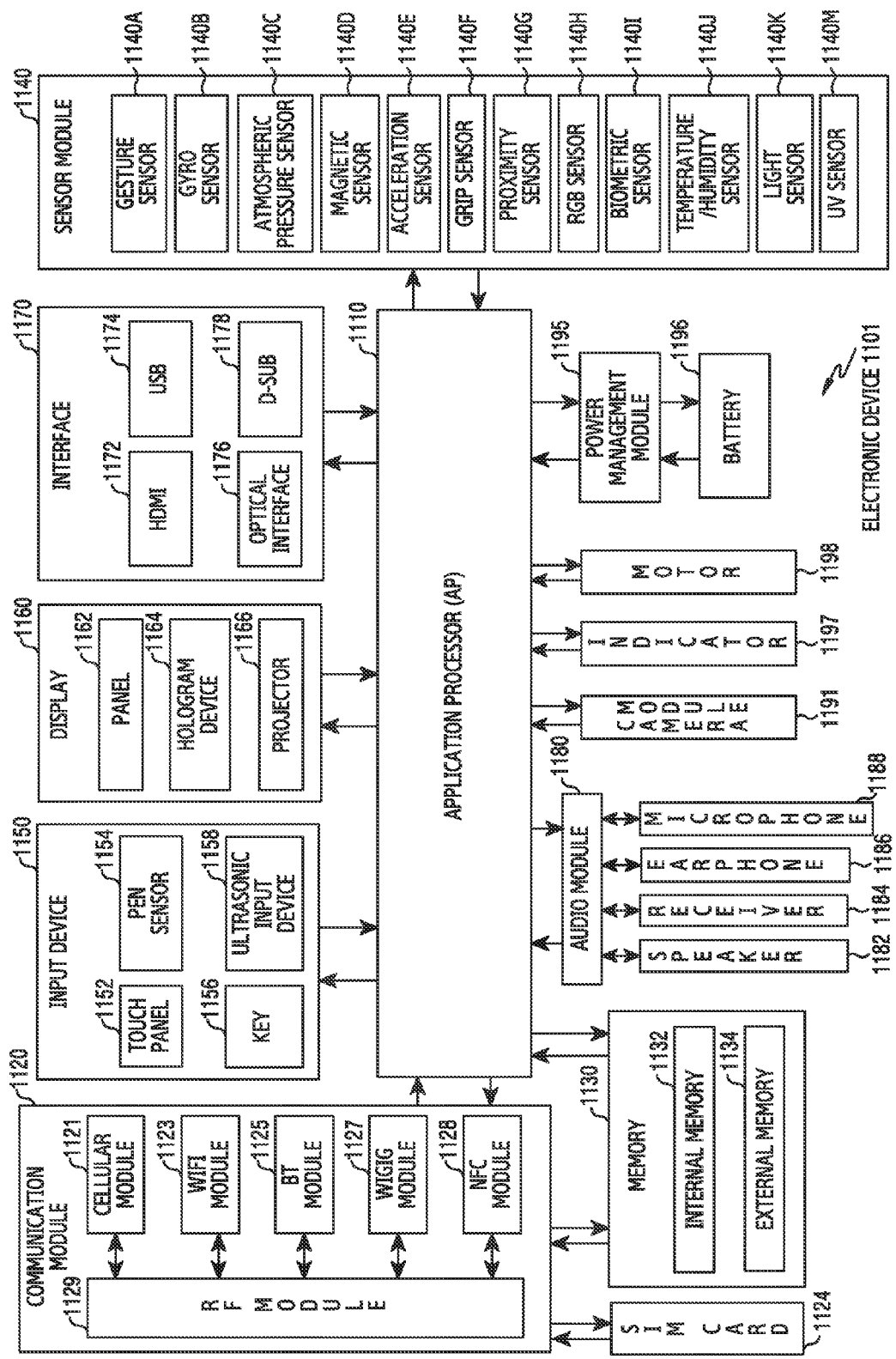
FIG. 11 is a block diagram of an example terminal in a wireless communication system according to this disclosure.

FIG. 11 is a block diagram of an example terminal in a wireless communication system according to another exemplary embodiment of the present disclosure. According to an exemplary embodiment of the present disclosure, the RF processing unit 1010 of FIG. 10 corresponds to an RF module 1129 of FIG. 11, the storage unit 1030 of FIG. 10 corresponds to a memory 1130 of FIG. 11, and the controller 1040 of FIG. 10 corresponds to an Application Processor (AP) 1110 of FIG. 11.

Referring to FIG. 11, the electronic device 1101 includes at least one processor 1110 (for example, Application Processor, AP), a communication module 1120, a subscriber identification module (SIM) card 1124, a memory 1130, a sensor module 1140, an input module 1150, a display 1160, an interface 1170, an audio module 1180, a camera module 1191, a power management module 1195, a battery 1196, an indicator 1197, and a motor 1198.

At least one processor 1110 is included in the electronic device 1101 so as to perform predetermined functions of the electronic device 1101. According to an embodiment of the present disclosure, the processor 1110 includes at least one application processor (AP). Although FIG. 11 shows the AP as being included as an element of the processor 1110, this is merely an example and it will be apparent that the processor 1110 serves as the AP.

The AP controls a plurality of hardware or software components connected to the AP by driving an operating system or an application program. The AP processes various data including multimedia data and performs calculations according to the data processing. The AP may, for example, be implemented as a system on chip (SoC). According to an embodiment of the present disclosure, the processor 1110 further includes a graphic processing unit (GPU).

The communication module 1120 transmits and receives data in communication between the electronic device 1101 and any other external device connected thereto through a network. According to an embodiment of the present disclosure, the communication module 1120 includes a cellular module 1121, a Wi-Fi module 1123, a BT module 1125, a WiGiG module 1127, an NEC module 1128, and a radio frequency (RF) module 1129.

The cellular module 1121 provides a voice call, a video call, a short message service (SMS), or an Internet service through a communication network (such as LTE, LTE-A, CDMA, WCDMA, WiBro, or GSM). Further, the cellular module 1121 distinguishes between and authenticates electronic devices in a communication network using, for example, a SIM (such as the SIM card 1124). According to an embodiment of the present disclosure, the cellular module 1121 performs at least some of functions that are provided by the AP 1110. The cellular module 1121 performs, for example, at least some of multimedia control functions.

According to an embodiment of the present disclosure, the cellular module 1121 includes a communication processor (CP). Further, the cellular module 1121, for example, is implemented as an SoC. Although FIG. 11 shows the elements such as the cellular module 1121 (such as CP), the memory 1130, and the power management module 1195 as being separate from the AP 1110, the AP 1110 is implemented to include at least some (such as the cellular module 1121) of the above elements according to an embodiment of the present disclosure.

According to an embodiment of the present disclosure, the AP 1110 or the cellular module 1121 (such as CP) loads a command or data received from at least one of a non-volatile memory and any other element connected to each of the AP 1110 and the cellular module 1121 into a volatile memory and processes the command or data loaded into the volatile memory. Further, the AP 1110 or the cellular module 1121 stores data received from or generated by at least one other element in a non-volatile memory.

According to an embodiment of the present disclosure, the Wi-Fi module 1123 or the cellular module 1121 is a module for transmitting and receiving a signal of a specific band, such as 2.4 GHz band. And the WiGiG module 1127 a module for transmitting and receiving a signal of a different band, e.g., 60 GHz band.

The Wi-Fi module 1123, the BT module 1125, the WiGiG module 1127, or the NFC module 1128 may, for example, include a processor for processing data transmitted and received through the corresponding module. Although FIG. 11 shows each of the cellular module 1121, the Wi-Fi module 1123, the BT module 1125, the WiGiG module 1127, and the NFC module 1128 as being a separate block, at least some (such as two or more) of the cellular module 1121, the Wi-Fi module 1123, the BT module 1125, the WiGiG module 1127, and the NEC module 1128 is included in one integrated chip (IC) or one IC package. For example, at least some of the processors corresponding respectively to the cellular module 1121, the Wi-Fi module 1123, the BT module 1125, the WiGiG module 1127, and the NEC module 1128 (such as the CP corresponding to the cellular module 1121 and the Wi-Fi processor corresponding to the Wi-Fi module 1123) can be implemented as one SoC.

The RF module 1129 transmits and receives data, for example, RF signals. Although not shown in the drawing, the RF module 1129 may, for example, include a transceiver, a power amp module (PAM), a frequency filter, a low noise amplifier (LNA), or the like. Further, the RF module 1129 further includes a component for transmitting and receiving an electromagnetic wave in the free airspace in wireless communication, for example, a conductor or a conducting wire. Although FIG. 11 shows the cellular module 1121, the Wi-Fi module 1123, the BT module 1125, the WiGiG module 1127, and the NFC module 1128 as sharing one RF module 1129, at least one of the cellular module 1121, the Wi-Fi module 1123, the BT module 1125, the WiGiG module 1127, and the NFC module 1128 transmits and receives an RF signal through a separate RF module according to an embodiment of the present disclosure.

The SIM card 1124 is a card in which a SIM is implemented and is inserted into a slot formed in a predetermined position of the electronic device. The SIM card 1124 includes unique identification information (such as an integrated circuit card identifier (ICCID)) or unique subscriber information (such as an international mobile subscriber identity (IMSI)).

The memory 1130 includes an internal memory 1132 or an external memory 1134. The internal memory 1132 may, for example, include at least one of a volatile memory (such as a dynamic random access memory (DRAM), a static RAM (SRAM), or a synchronous DRAM (SDRAM)) and a non-volatile memory (such as a one-time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, or a not or (NOR) flash memory).

According to an embodiment of the present disclosure, the internal memory 1132 is a solid state drive (SSD). The external memory 1134 further includes a flash drive, for example, a compact flash (CF), a secure digital (SD), a Micro-SD, a Mini-SD, an extreme digital (xD), a Memory Stick, or the like. The external memory 1134 is functionally connected to the electronic device 1101 through various interfaces. According to an embodiment of the present disclosure, the electronic device 1101 further includes a storage device (or storage medium) such as a hard drive.

The sensor module 1140 measures a physical quantity or senses an operational state of the electronic device 1101 and converts the measured or sensed information to an electric signal. The sensor module 1140 includes, for example, at least one of a gesture sensor 1140A, the gyro sensor 1140B, an atmospheric pressure sensor 1140C, a magnetic sensor 1140D, the acceleration sensor 1140E, a grip sensor 1140F, a proximity sensor 1140G, a color sensor 1140H (such as a red/green/blue (RGB) sensor), a biometric sensor 1140I, a temperature/humidity sensor 1140J, the geomagnetic sensor 1140K, and an ultraviolet (UV) sensor 1140M. Additionally or alternatively, the sensor module 1140 may, for example, include an E-nose sensor, an electromyography (EMG) sensor, an electroencephalogram (EEG) sensor, an electrocardiogram (ECG) sensor, an Infrared (IR) sensor, an iris sensor, a fingerprint sensor, and the like. The sensor module 1140 further includes a control circuit for controlling at least one sensor included therein.

The input module 1150 includes a touch panel 1152, a (digital) pen sensor 1154, a key 1156, or an ultrasonic input unit 1158. The touch panel 1152 that recognizes a touch input can, for example, includes at least one of a capacitive touch panel, a resistive touch panel, an infrared touch panel, and an acoustic wave touch panel. The touch panel 1152 further includes a control circuit. The capacitive touch panel is able to recognize physical contact or proximity. The touch panel 1152 further includes a tactile layer, in this case, the touch panel 152 provides a tactile response to a user.

The (digital) pen sensor 1154 can be implemented using a means identical or similar to a means for receiving a touch input from a user or using a separate recognition sheet. The key 1156 may, for example, include a physical button, an optical key, or a keypad. The ultrasonic input unit 1158 is a unit that identifies data by generating an ultrasonic signal through an input tool and detecting a sonic wave through a microphone (e.g., the microphone 1188) in the electronic device 1101 and is capable of wireless recognition. According to an embodiment of the present disclosure, the electronic device 1101 receives a user input from an external device (e.g. computer or server) connected thereto using the communication module 1120.

The display 1160 includes a panel 1162, a hologram unit 1164, or a projector 1166. The panel 1162 may, for example, be a liquid crystal display (LCD) or an active matrix-organic light emitting diode (AM-OLED). The panel 1162 may, for example, be implemented to be flexible, transparent, or wearable. The panel 1162 and the touch panel 1152 are incorporated into one module. The hologram unit 1164 shows a stereoscopic image in the air using light interference. The projector 1166 displays an image by projecting light onto a screen. The screen may, for example, be located inside or outside of the electronic device 1101. According to an embodiment of the present disclosure, the display 1160 further includes a control circuit for controlling the panel 1162, the hologram unit 1164, or the projector 1166.

The interface 1170 may, for example, include a HDMI 1172, a USB 1174, an optical interface 1176, or a D-sub-miniature (D-sub) 1178. The interface 1170 may, for example, be included in the communication interface 1160 shown in FIG. 11. Additionally or alternatively, the interface 1170 may, for example, include a mobile high-definition link (MHL) interface, an SD card/multi-media card (MMC) interface, or an infrared data association (IrDA) interface.

The audio module 1180 converts a sound and an electrical signal in a bidirectional manner, that is, converts a sound to an electrical signal and vice versa. The audio module 1180 may, for example, process sound information input or output through a speaker 1182, a receiver 1184, earphones 1186, or a microphone 1188.

The camera module 1191 is a device that takes both still and moving images and includes at least one image sensor (e.g., front sensor or rear sensor), a lens, an image signal processor (ISP), or a flash (e.g., light emitting diode (LED) or xenon lamp) according to an embodiment of the present disclosure.

The power management module 1195 manages the power in the electronic device 1101. The power management module 1195 may, for example, include a power management integrated circuit (PMIC), a charger IC, or a battery or fuel gauge.

The PMIC may, for example, be mounted in an integrated circuit or an SoC semiconductor. The charging methods are classified into wired charging and wireless charging. The charger IC charges a battery and prevents an overvoltage or excess current from being induced or flowing from a charger.

The battery gauge may, for example, measure the residual capacity, charge in voltage, current, or temperature of the battery. The battery 1196 store or generate electricity and supplies power to the electronic device 1101 using the stored or generated electricity. The battery 1196 includes, for example, a rechargeable battery or a solar battery.

The indicator 1197 displays a specific state of the electronic device 1101 or a part thereof (such as the AP 1110), for example, a boot-up state, a message state, or a state of charge (SOC). The motor 1198 converts an electrical signal to a mechanical vibration. The electronic device 1101 includes a processing unit (such as GPU) for supporting a mobile TV. The processing unit for supporting the mobile TV processes media data pursuant to a certain standard such as digital multimedia broadcasting (DMB), digital video broadcasting (DVB), or media flow.

Each of the above described elements of the electronic device according to various embodiments of the present disclosure includes one or more components, and the name of a corresponding element varies according to the type of electronic device. The electronic device according to various embodiments of the present disclosure includes at least one of the above described elements and can exclude some of the elements or can further include other additional elements. Further, some of the elements of the electronic device according to various embodiments of the present disclosure are coupled to form a single entity while performing the same functions as those of the corresponding elements before the coupling.

Figure 12:
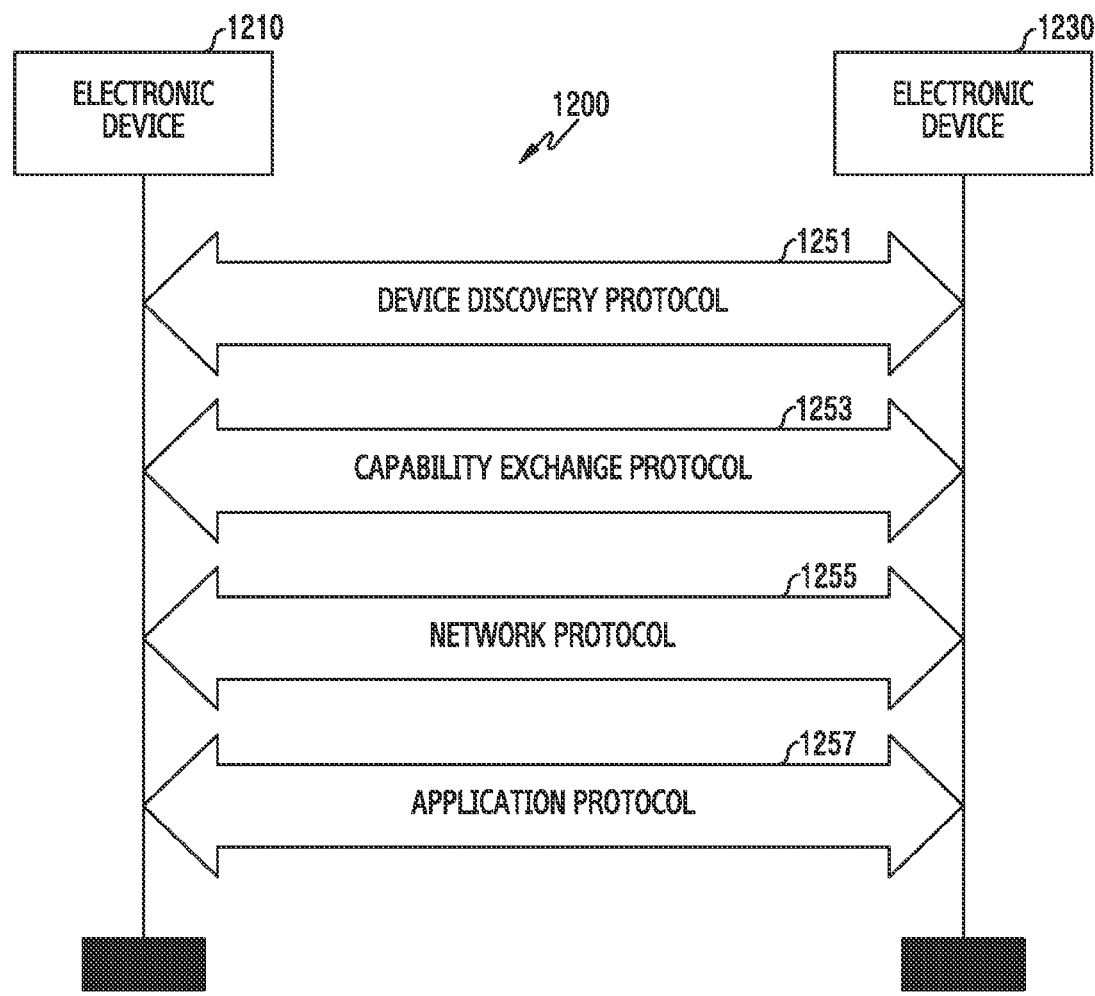
FIG. 12 illustrates an example communication protocol between a plurality of electronic devices in a wireless communication system according to this disclosure.

FIG. 12 illustrates an example communication protocol between a plurality of electronic devices in a wireless communication system according to this disclosure. Referring to FIG. 12, for example, a communication protocol 1200 includes a device discovery protocol 1251, a capability exchange protocol 1253, a network protocol 1255, an application protocol 1257, and the like.

According to an exemplary embodiment, the device discovery protocol 1251 is a protocol by which electronic devices (e.g., an electronic device 1210 or an electronic device 1230) detect an external electronic device that communicates therewith or are connected with the detected external electronic device. For example, the electronic device 1210 detects the electronic device 1230 as a device that communicates with the electronic device 1210 through a communication method (e.g., WiFi, BT, USB, etc.) that is used in the electronic device 1210 by using the device discovery protocol 1251. The electronic device 1210 acquires and stores identification information for the detected electronic device 1230 by using the device discovery protocol 1251 to establish a communication connection with the electronic device 1230. The electronic device 1210 establishes a communication connection with the electronic device 1230, for example, on the basis of at least the identification information.

According to a certain exemplary embodiment, the device discovery protocol 1251 is a protocol for mutual authentication between a plurality of electronic devices. For example, the electronic device 1210 performs authentication between the electronic device 1210 and the electronic device 1230 on the basis of communication information (e.g., a Media Access Control (MAC) address, a Universally Unique IDentifier (UUID), a SubSystem IDentification (SSID), and an Internal Protocol (IP) address) for a connection with at least the electronic device 1230.

According to an exemplary embodiment, the capability exchange protocol 1253 is a protocol for exchanging information related to capability of a service that is supported in at least one of the electronic device 1210 and the electronic device 1230. For example, the electronic device 1210 and the electronic device 1230 mutually exchanges information related to each service currently being provided, through the capability exchange protocol 1253. Exchangeable information includes identification information indicating a specific service among a plurality of services that is supported in the electronic device 1210 and the electronic device 1230. For example, the electronic device 1210 receives identification information of a specific service provided from the electronic device 1230 by the electronic device 1230 through the capability exchange protocol 1253. In this case, the first electronic device 1210 determines whether the electronic device 1210 supports the specific service on the basis of the received identification information.

According to an exemplary embodiment, the network protocol 1255 is a protocol for controlling a data flow transmitted/received between electronic devices (e.g., the electronic device 1210 and the electronic device 1230) connected to enable communication, for example, to provide a service through interworking. For example, at least one of the electronic device 1210 and the electronic device 1230 perform error control, data quality control, and the like by using the network protocol 1255. Additionally or alternatively, the network protocol 1255 determines a transmission format of data transmitted/received between the electronic device 1210 and the electronic device 1230. In addition, at least one of the electronic device 1210 and the electronic device 1230 performs at least session management (e.g., session connection or session termination) for mutual data exchange by using the network protocol 1255.

According to an exemplary embodiment, the application protocol 1257 is a protocol for providing a process or information for exchanging data related to a service provided to an external electronic device. For example, the electronic device 1210 provides the service to the electronic device 1230 through the application protocol 1257. According to an exemplary embodiment, the communication protocol 1200 includes a standard communication protocol or a communication protocol designated by an individual or an organization (e.g., a communication protocol designated autonomously by a communication device manufacturer vendor or a network providing vendor) or a combination of them.

Figure 13:
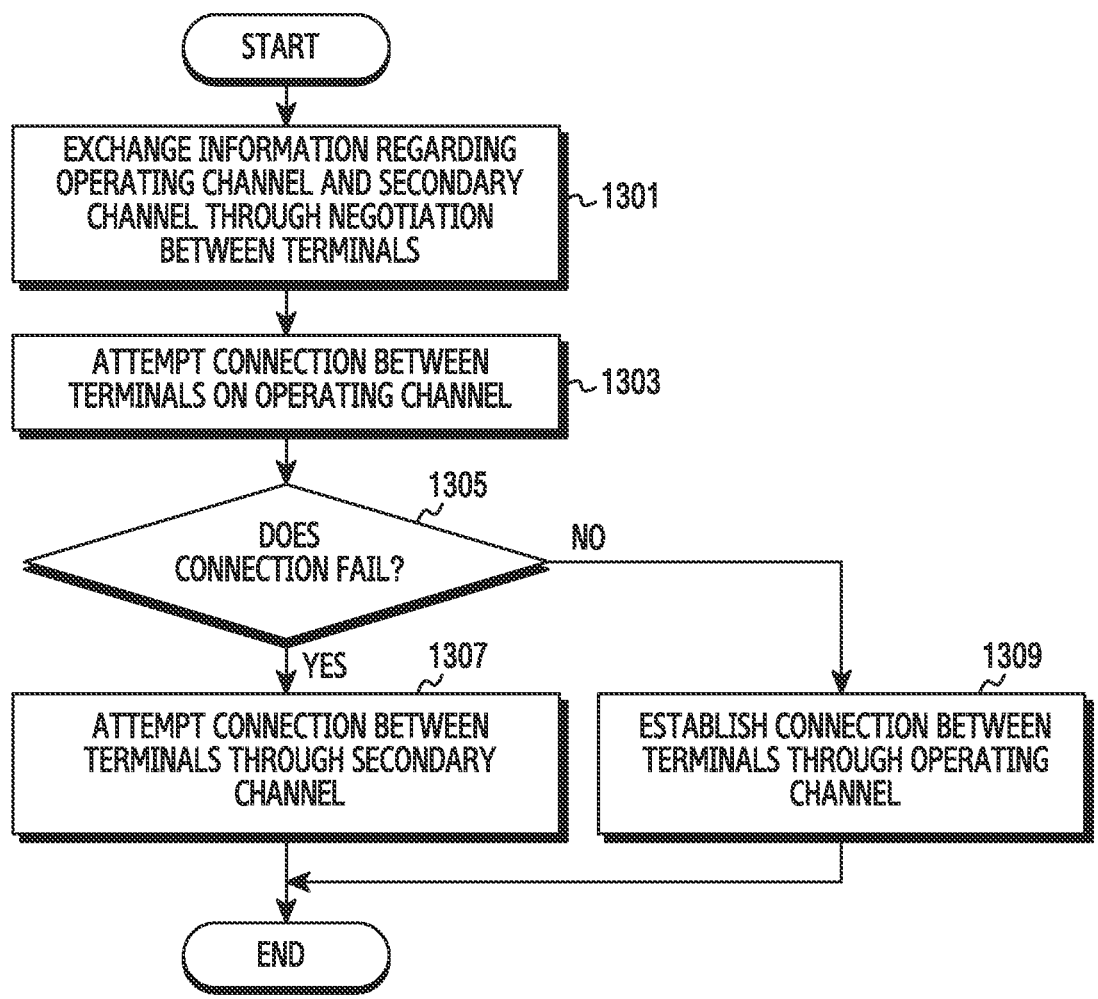
FIG. 13 is a flowchart of an example connection procedure for communication in a wireless communication system according to this disclosure.

FIG. 13 is a flowchart of an example connection procedure for communication in a wireless communication system according to an exemplary embodiment of the present disclosure. Referring to FIG. 13, first, in step 1301, a terminal performs a controller negotiation process for communication with a peer terminal in this case, the terminal transmits a signal for the control negotiation process through a first channel belonging to a first band, that is, through a connection channel. In addition, through the controller negotiation process, the terminal exchanges information regarding second and third channels belonging to a second band with a peer terminal. The information regarding the second and third channels includes at least one of a channel number of a corresponding channel, information indicating a frequency band to which the channel belongs, and time duration information for determining, a connection failure on the channel. In addition, according to another exemplary embodiment, information regarding the third channel is configured in a format of a channel list including a plurality of channels. In this case, the third channel is identified according to a priority determined on the basis of an order in the channel list.

In the wireless communication system according to the exemplary embodiment of the present disclosure, channels that are used in P2P communication can belong to the first band and the second band, and the first band and the second band have different frequency characteristics. For example, the first band includes a 2.4 GHz band, and the second band includes a 60 GHz band. Further, the third channel belonging to the first band, such as the secondary channel, is a 2.4 GHz band channel 5, and the second channel belonging to the second band, such as the operating channel, is a 60 GHz band channel 2.

Thereafter, in step 1303, the terminal attempts the connection with the peer terminal on the second channel belonging to the second band according to information determined through the controller negotiation process. In other words, the terminal completes the controller negotiation process through the first channel belonging to the first band, that is, through a connection channel, and thereafter terminates a connection on the connection channel. Further, the terminal attempts a connection on a new second channel belonging to the second band. If the terminal is determined as a controller, the terminal transmits to a peer terminal a request signal for requesting a connection on the second channel. On the other hand, if the terminal is not determined as the controller, the terminal attempts to receive the request signal on the second channel, in other words, waits to receive the request signal.

If at step 1305, the connection fails as a result of the connection attempt, the procedure proceeds to step 1307, and otherwise, the procedure proceeds to step 1309. If the procedure proceeds to step 1307, the terminal terminates the connection on the second channel belonging to the second band. Further, the terminal re-attempts a connection on the third channel belonging to the first band. In other words, if the connection fails on the second channel belonging to the second band, the terminal terminates the connection with the second channel belonging to the second band, and re-attempts the connection on the third channel belonging to the first band.

Otherwise, proceeding to step 1309, the terminal is connected with a peer terminal through the second channel belonging to the second band. By using such an operation, the present disclosure predetermines a channel to be changed if a channel change is necessary for communication between devices in a wireless communication system, and thus prevents a connection delay which occurs when the channel is not predetermined. Accordingly, communication is effectively achieved between the devices in the wireless communication system.

According to various embodiments of the present disclosure, at least some of the devices or methods according to various embodiment of the present disclosure as defined by the appended claims and/o disclosed herein is implemented in the form of hardware, software, firmware, or any combination (e.g., module or unit) of at least two of hardware, software, and firmware. The module is the smallest unit of an integrated component or a part thereof and is also the smallest unit that performs various embodiments of the present disclosure or a part thereof. The module is mechanically or electronically implemented.

If implemented in software, a computer-readable storage medium (or storage medium readable by a computer) storing at least one program (or programming module) is provided. The software may, for example, be implemented by instructions stored in a computer-readable storage medium in the form of a programming module. The at least one program includes instructions that cause the electronic device to perform the methods according to various embodiments of the present disclosure as defined by the appended claims and/or disclosed herein.

The computer-readable storage medium includes magnetic media such as a hard disc, a floppy disc, and a magnetic tape; optical media such as a compact disc ROM (CD-ROM) and a DVD; magneto-optical media such as a floptical disk; a hardware device specifically configured to store and execute program instructions (e.g., programming module), such as a ROM, a RAM, and a flash memory; an EEPROM; a magnetic disc storage device; any other type of optical storage device; and a magnetic cassette. Alternatively, any combination of some or all forms a memory in which the program is stored. Further, a plurality of such memories can be included in the electronic device.

In addition, the program is stored in an attachable storage device capable of accessing the electronic device through a communication network such as the Internet, an intranet, a local area network (LAN), a wide LAN (WLAN), a storage area network (SAN), or any combination thereof. Such a storage device accesses the electronic device via an external port. Further, a separate storage device on the communication network accesses a portable electronic device. Any of the hardware devices as described above are configured to work as one or more software modules in order to perform the operations according to various embodiments of the present disclosure, and vice versa.

Any of the modules or programming modules according to various embodiments of the present disclosure includes at least one of the above described elements, exclude some of the elements, or further include other additional elements. The operations performed by the modules, programming module, or other elements according to various embodiments of the present disclosure can be executed in a sequential, parallel, repetitive, or heuristic manner. Further, some operations can be executed in a different order, some of the operations can be omitted, or other operations can be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating a terminal in a wireless communication system, the method comprising:
   transmitting information for connection through a channel of a second frequency band and other information for connection through a channel of a third frequency band to a peer terminal on a channel of a first frequency band;
   transmitting a first request signal for connection with the peer terminal on the channel of the second frequency band; and
   if a response signal for the first request signal is not received, transmitting a second request signal for connection with the peer terminal on the channel of the third frequency band,
   wherein the information is used for reception of the first request signal by the peer terminal, and
   wherein the other information is used for reception of the second request signal by the peer terminal.

2. The method of claim 1, wherein the information comprises information for indicating the second frequency band,
   further comprising transmitting, to the peer terminal on the channel of the first frequency band, information for indicating a time duration in which the channel of the second frequency band is changed to the channel of the third frequency band when the connection through the channel of the second frequency band fails.

3. The method of claim 2, further comprising:
   driving a module for processing a signal of a second band if it is confirmed that the channel of the second frequency band is comprised in the second band based on the information.

4. The method of claim 2, wherein the transmitting of the second request signal on the channel of the third frequency band comprises transmitting the second request signal on the channel of the third frequency band if the response signal is not received until a time elapsed by the time duration from a time at which the connection through the channel of the second frequency band is attempted.

5. The method of claim 1, wherein the other information comprises secondary channel information which designates a channel for re-attempting a connection in a connection failure situation, and
   wherein the channel of the third frequency band is identified by using the secondary channel information.

6. A method of operating a terminal in a wireless communication system, the method comprising:
   receiving information for connection through a channel of a second frequency band and other information for connection through a channel of a third frequency band from a peer terminal on a channel of a first frequency band; and if a first request signal is not received from the peer terminal on the channel of the second frequency band based on the information, receiving a second request signal from the peer terminal on the channel of the third frequency band based on the other information.

7. The method of claim 6, wherein the information comprises information for indicating the second frequency band, further comprising receiving, from the peer terminal on the channel of the first frequency band, information for indicating a time duration in which the channel of the second frequency band is changed to the channel of the third frequency band when the connection through the channel of the second frequency band fails.

8. The method of claim 7, further comprising driving a module for processing a signal of a second band if it is confirmed that the channel of the second frequency band is comprised in the second band based on the information.

9. The method of claim 7, wherein the receiving the second request signal from the peer terminal on the channel of the third frequency band comprises receiving the second request signal on the channel of the third frequency band if the first request signal is not received until a time elapsed by the time duration from a time at which the connection through the channel of the second frequency band is attempted.

10. The method of claim 6, Wherein the other information comprises secondary channel information which designates a channel for re-attempting a connection in a connection failure situation, and wherein the channel of the third frequency band is identified by using the secondary channel information.

11. A terminal in a wireless communication system, the terminal comprising:

a transceiver; and at least one processor operatively coupled with the transceiver, wherein the at least one processor is configured to control to:

transmit information for connection through a channel of a second frequency band and other information for connection through a channel of a third frequency band to a peer terminal on a channel of a first frequency band, transmit a first request signal for connection with the peer terminal on the channel of the second frequency band, and transmit a second request signal for connection with the peer terminal on the channel of the third frequency band if a response signal for the first request signal is not received, wherein the information is used for reception of the first request signal by the peer terminal, and wherein the other information is used for reception of the second request signal by the peer terminal.

12. The terminal of claim 11, wherein the information comprises information for indicating the second frequency band and wherein the at least one processor is further configured to control to transmit information for indicating a time duration in which the channel of the second frequency band is changed to the channel of the third frequency band when the connection through the channel of the second frequency band fails.

13. The terminal of claim 12, wherein the at least one processor is further configured to drive a module for processing a signal of a second band if it is confirmed that the channel of the second frequency band is comprised in the second band based on the information.

14. The terminal of claim 12, wherein the at least one processor is configured to control to transmit the second request signal on the channel of the third frequency band if the response signal is not received until a time elapsed by the time duration from a time at which the connection through the channel of the second frequency band is attempted.

15. The terminal of claim 11, wherein the other information comprises secondary channel information which designates a channel for re-attempting a connection in a connection failure situation, and wherein the channel of the third frequency band is identified by using the secondary channel information.

16. A terminal in a wireless communication system, the terminal comprising:

a transceiver; and at least one processor operatively coupled with the transceiver, wherein the at least one processor is configured to control to:

receive information for connection through a channel of a second frequency band and other information for connection through a channel of a third frequency band from a peer terminal on a channel of a first frequency band, and receive a second request signal from the peer terminal on the channel of the third frequency band based on the other information if a first signal is not received from the peer terminal on the channel of the second frequency band based on the information.

17. The terminal of claim 16, wherein the information comprises information for indicating the second frequency band, and wherein the at least one processor is further configured to control to receive, from the peer terminal on the channel of the first frequency band, information for indicating a time duration in which the channel of the second frequency band is changed to the channel of the third frequency band when the connection through the channel of the second frequency band fails.

18. The terminal of claim 17, wherein the at least one processor is further configured to drive a module for processing a signal of a second band if it is confirmed that the channel of the second frequency band is comprised in the second band based on the information.

19. The terminal of claim 17, wherein the at least one processor is configured to receive the second request signal on the channel of the third frequency band if the first signal is not received until a time elapsed by the time duration from a time at which the connection through the channel of the second frequency band is attempted.

20. The terminal of claim 16, wherein the other information comprises secondary channel information which designates a channel for re-attempting a connection in a connection failure situation, and wherein the channel of the third frequency band is identified by using the secondary channel information.

* * * * *